United States Patent
Brown et al.

(10) Patent No.: US 8,880,888 B2
(45) Date of Patent: *Nov. 4, 2014

(54) PRIVACY-ENHANCED E-PASSPORT AUTHENTICATION PROTOCOL

(75) Inventors: Daniel R. L. Brown, Mississauga (CA); Scott A. Vanstone, Campbellville (CA)

(73) Assignee: Certicom Corp., Mississauga (CA)

( * ) Notice: Subject to any disclaimer, the term of this patent is extended or adjusted under 35 U.S.C. 154(b) by 249 days.

This patent is subject to a terminal disclaimer.

(21) Appl. No.: 12/776,803

(22) Filed: May 10, 2010

(65) Prior Publication Data

US 2010/0250945 A1    Sep. 30, 2010

Related U.S. Application Data

(63) Continuation of application No. 11/436,986, filed on May 19, 2006, now Pat. No. 7,720,221.

(60) Provisional application No. 60/682,862, filed on May 20, 2005.

(51) Int. Cl.
*H04L 9/32* (2006.01)
*H04L 9/30* (2006.01)

(52) U.S. Cl.
CPC ............ *H04L 9/3231* (2013.01); *H04L 9/3247* (2013.01); *H04L 2209/805* (2013.01); *H04L 9/3066* (2013.01)
USPC .............................. 713/172; 713/169; 380/30

(58) Field of Classification Search
USPC ........................................................ 380/30
See application file for complete search history.

(56) References Cited

U.S. PATENT DOCUMENTS

| | | | |
|---|---|---|---|
| 6,041,410 A * | 3/2000 | Hsu et al. ........................ | 713/186 |
| 6,230,269 B1 * | 5/2001 | Spies et al. ..................... | 713/182 |
| 6,487,661 B2 | 11/2002 | Vanstone et al. | |
| 6,598,161 B1 | 7/2003 | Kluttz et al. | |
| 6,636,968 B1 * | 10/2003 | Rosner et al. ................. | 713/178 |
| 6,748,533 B1 | 6/2004 | Wu et al. | |
| 7,123,721 B2 * | 10/2006 | Panjwani et al. ............. | 380/270 |
| 7,178,027 B2 * | 2/2007 | Faigle ........................... | 713/169 |
| 7,249,259 B1 | 7/2007 | Vanstone et al. | |
| 7,356,140 B2 * | 4/2008 | Imai et al. ....................... | 380/30 |
| 7,571,471 B2 | 8/2009 | Sandhu et al. | |
| 7,657,748 B2 * | 2/2010 | Gentry .......................... | 713/170 |
| 8,209,535 B2 * | 6/2012 | Lee et al. ...................... | 713/169 |
| 8,549,283 B2 * | 10/2013 | Lim ............................... | 713/153 |
| 2001/0008013 A1 * | 7/2001 | Johnson et al. .............. | 713/170 |
| 2002/0013898 A1 * | 1/2002 | Sudia et al. ................... | 713/155 |

(Continued)

OTHER PUBLICATIONS

Zheng, Yuliang; Imai, Hideki; "How to construct efficient signcryption schemes on elliptic curves"; Dec. 15, 1998; pp. 227 to 233; Information Processing Letters; vol. 68, No. 5; Elsevier; ISSN: 0020-0190.

(Continued)

*Primary Examiner* — Eleni Shiferaw
*Assistant Examiner* — Phy Anh Vu
(74) *Attorney, Agent, or Firm* — John R. S. Orange; Blake, Cassels & Graydon LLP

(57) ABSTRACT

A passport authentication protocol provides for encryption of sensitive data such as biometric data and transfer of the encryption key from the passport to the authentication authority to permit comparison to a reference value.

15 Claims, 3 Drawing Sheets

(56) References Cited

U.S. PATENT DOCUMENTS

| | | | |
|---|---|---|---|
| 2002/0021804 A1* | 2/2002 | Ledzius et al. | 380/44 |
| 2002/0062451 A1* | 5/2002 | Scheidt et al. | 713/201 |
| 2002/0165912 A1* | 11/2002 | Wenocur et al. | 709/203 |
| 2003/0023858 A1 | 1/2003 | Banerjee et al. | |
| 2003/0044019 A1* | 3/2003 | Vanstone et al. | 380/277 |
| 2003/0081785 A1* | 5/2003 | Boneh et al. | 380/277 |
| 2003/0135740 A1* | 7/2003 | Talmor et al. | 713/186 |
| 2003/0147536 A1* | 8/2003 | Andivahis et al. | 380/277 |
| 2004/0030921 A1* | 2/2004 | Aldridge et al. | 713/200 |
| 2004/0131190 A1* | 7/2004 | Nobel et al. | 380/282 |
| 2005/0033974 A1* | 2/2005 | Ansell et al. | 713/193 |
| 2005/0091501 A1* | 4/2005 | Osthoff et al. | 713/181 |
| 2005/0135606 A1* | 6/2005 | Brown | 380/28 |
| 2005/0240778 A1* | 10/2005 | Saito | 713/186 |
| 2005/0246533 A1* | 11/2005 | Gentry | 713/170 |
| 2006/0129818 A1 | 6/2006 | Kim et al. | |
| 2008/0000969 A1* | 1/2008 | Salomonsen et al. | 235/386 |

OTHER PUBLICATIONS

Technical Report—"PKI for Machine Readable Travel Documents offering ICC Read-Only Access"; Version 1.1; Oct. 1, 2004; International Civil Aviation Organization.

Hinde, S.; "2001: A Privacy Odyssey Revisited"; Jan. 1, 2001; pp. 16 to 34; Computers & Security; vol. 21, No. 1; Elsevier Science Publishers: ISSN: 0167-4048.

Carnerero, Alvaro F.; Supplementary Search Report from corresponding European Application No. 06741548.9; search completed Sep. 24, 2010.

Technical Report—PKI for Machine Readable Travel Documents; Version 1.1; Oct. 1, 2004; International Civil Aviation Authority.

Juels, Ari et al.; "Security and Privacy Issues in E-passports"; Mar. 28, 2005; IEEE SecureComm 2005.

* cited by examiner

PRIVACY-ENHANCED E-PASSPORT AUTHENTICATION PROTOCOL

CROSS-REFERENCE TO RELATED APPLICATIONS

This application is a continuation of U.S. patent application Ser. No. 11/436,986 filed on May 19, 2006 and issued under U.S. Pat. No. 7,720,221, which claims priority from U.S. Provisional Patent Application No. 60/682,862 filed on May 20, 2005 hereby incorporated by reference.

TECHNICAL FIELD

The present invention relates to protocols for restricting access to sensitive information embedded in documents such as passports and identity cards.

BACKGROUND OF THE INVENTION

Existing passport security technology links identity of an individual by embedding a photograph within the passport.

The existing linkage is not cryptographically strong as substituting a different photograph is relatively easy. Also, the photograph is compared manually to the face of the traveler by the border control inspector, which has certain problems.

To enhance security, it has been proposed to provide machine-readable passport or identity card in which biometric data is stored in a chip within the document and can be retrieved for examination. Typically, the biometric data will be an iris scan, fingerprint or images of the face of the bearer.

The International Civil Aviation Organisation (ICAO) has proposed machine readable travel documents (MRTD), i.e. e-Passport system that authenticates the identity of individuals to border control stations by cryptographically linking the identity of the individual (such as name and nationality) to biometric data for the individual.

The cryptographic linkage is obtained by digitally signing the identity data and biometric data of the individual. The resulting signed identity and biometric information is conveyed from the passport to a passport reader. The signature binds the identity of the individual to the biometric identity, which makes faking a passport a cryptographically hard problem. A concern arises however that each individual's biometric information is highly sensitive and should not be inadvertently made available.

It is therefore an object of the present invention to obviate or mitigate the above disadvantages by making it more difficult for unauthorized parties to obtain the biometric information and other sensitive information from a document such as a passport.

BRIEF DESCRIPTION OF THE DRAWINGS

An embodiment of the invention will now be described with reference to the appended drawings wherein.

DETAILED DESCRIPTION OF THE INVENTION

Figure 1:
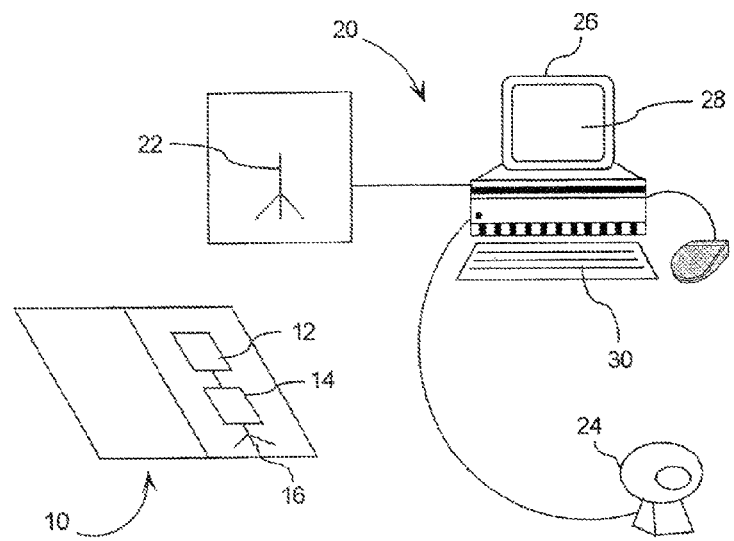
FIG. 1 is a schematic representation of a passport examination station.

Referring therefore to FIG. 1, a passport 10 includes a chip 12 and a radio frequency identification (RFID) tag 14 with an antenna 16. A reader 20 includes an antenna 22 to communicate with the antenna 16 and a scanner 24 to obtain a reference input from the bearer of the passport 10. The reference input may be a real time fingerprint scan or iris scan or a facial image. The reader 20 includes a data processing engine 26 to manipulate data received from the passport 10 and scanner 24 and a screen 28 to view the results of such manipulation. An input device 30, such as a keyboard or mouse is included to permit user inputs.

Figure 2:
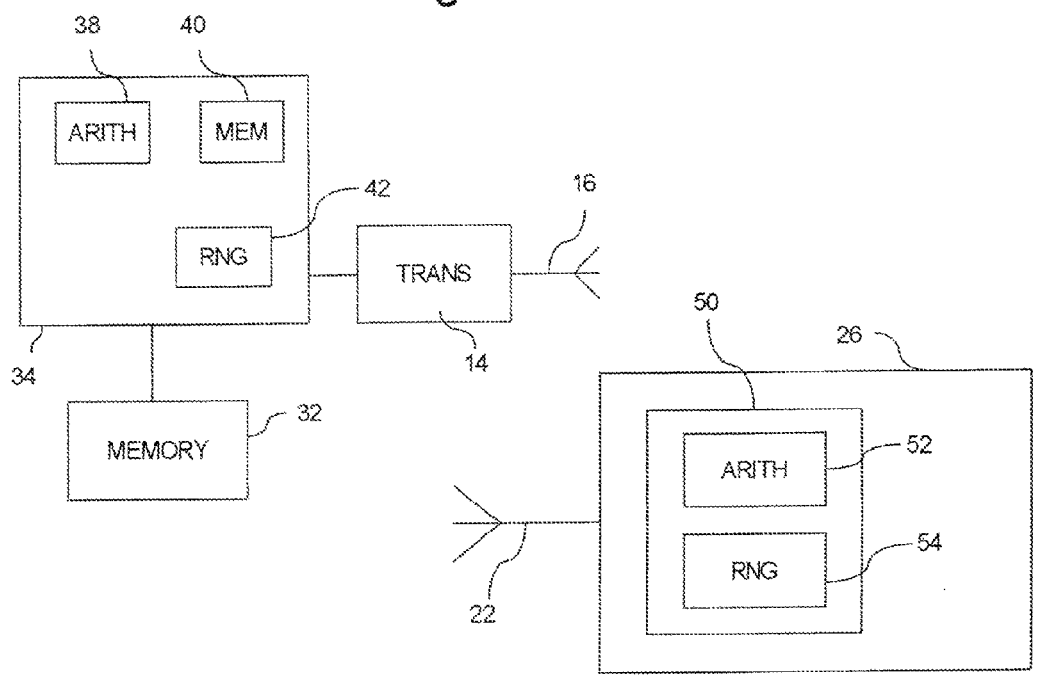
FIG. 2 is a schematic representation of the components of the passport and reader.
Figure 3A:
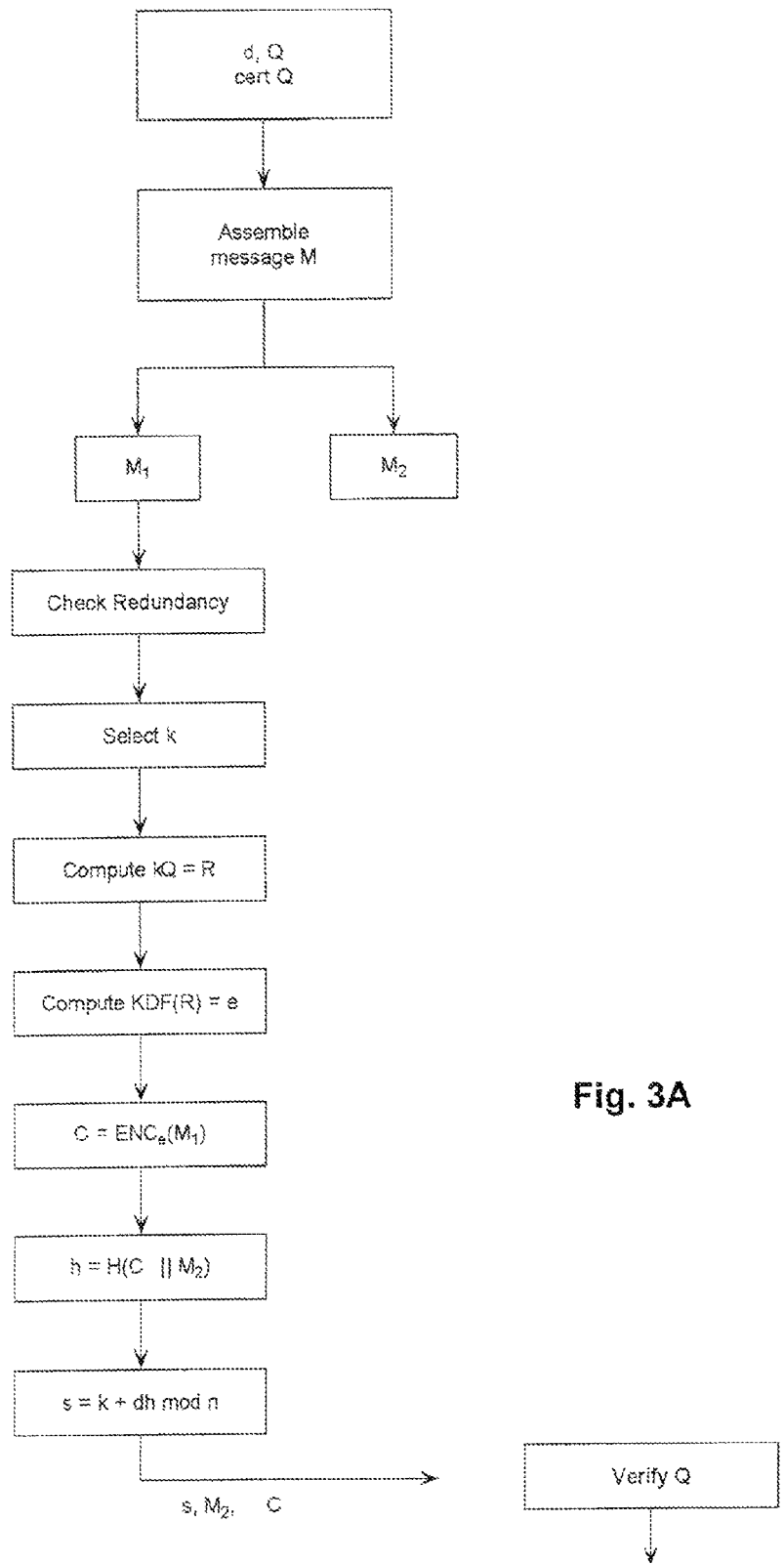
FIG. 3 is a representation of an exchange of data within the station.
Figure 3B:
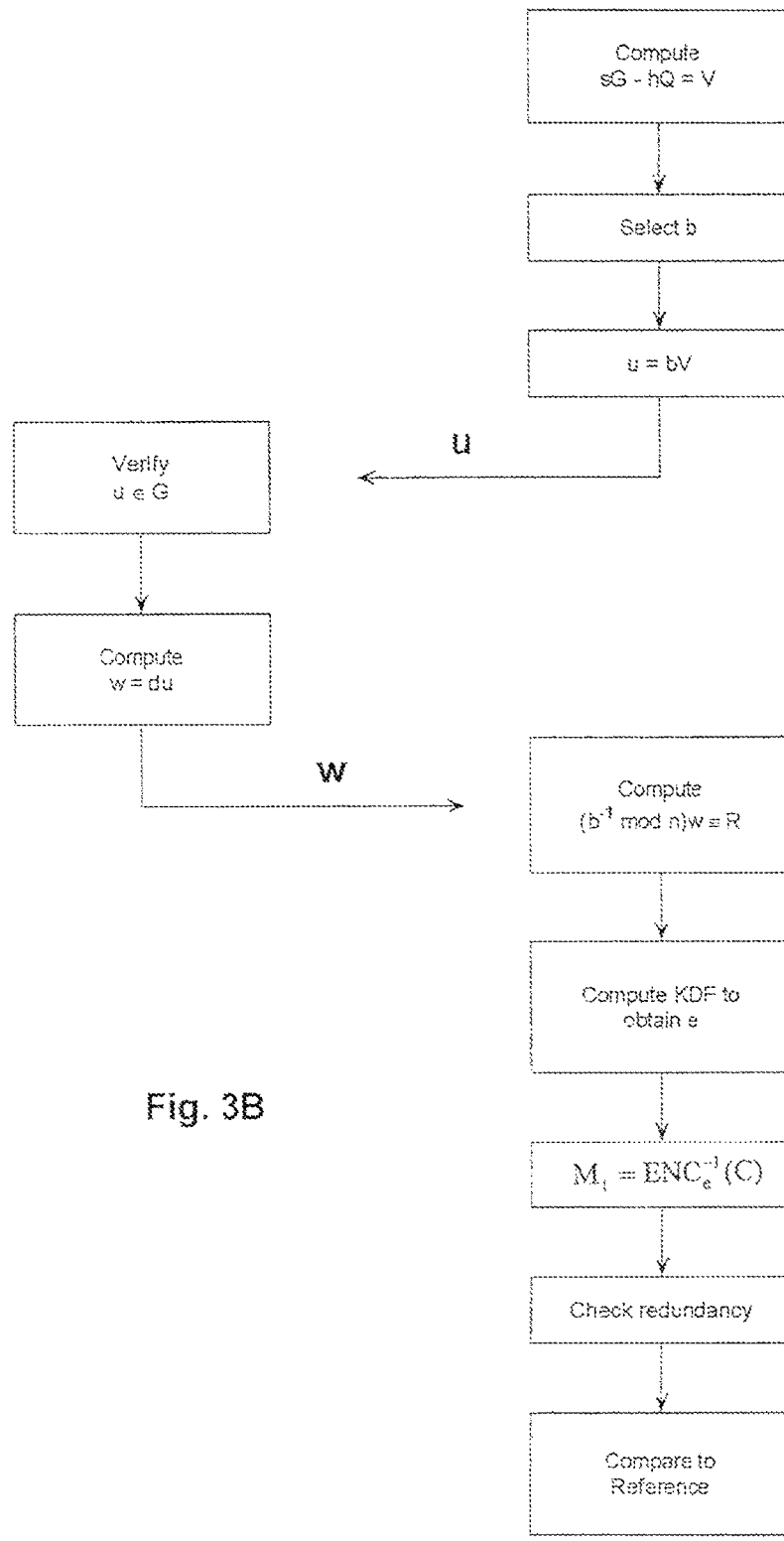

As shown in FIG. 2, the chip 12 contains a memory 32 to store biometric data and personal information such as name, nationality and date of birth. The memory 32 is designed to be tamperproof and communicates with a cryptographic unit 34 and data transmission network 36 connected to the antenna tag 14.

The cryptographic unit 34 includes an arithmetic processor 38 for performing cryptographic operations and a secure memory 40 for storing private keys and certificates. Preferably, the underlying cryptographic system is an elliptic curve cryptosystem. The cryptographic unit 34 includes the parameters of the underlying system, such as the curve, and the generator G of the points on the curve and has access to the public key Q of the passport.

In the preferred embodiment, the memory 40 includes a private signing key d, the corresponding public key Q=dG, and a certificate, Cert Q, which is issued by a certification authority, such as the passport issuer, which certifies the public key Q. The processor 38 can perform cryptographic operations such as point addition, key derivation and hash functions. The cryptographic unit 34 also includes a random number generator (RNG) 42 to provide integers for use as private session keys.

The data processing engine 26 of the reader 20 also includes a cryptographic unit 50 including a random number generator 52 and an arithmetic processor 54.

In operation, the scanner 20 initiates a message transfer by activating the chip 12 through the RFID tag 14. A message M is assembled consisting of the data required for processing the passport and confirming identity such as the biometric data, bearer's name, nationality and date of birth together with the certificate of the bearer's public key Cert Q. The data utilized will depend on the information required by the passport control.

The message M is divided into two parts, $M_1$, $M_2$, with the sensitive information to be maintained confidential such as the biometric data within the message part $M_1$. Less sensitive or publicly available information such as the country of issue or visa is included in the message part $M_2$.

A random number k is generated by the RNG 42 and a value R=kQ computed. The value R is used in a key derivation function (KDF) performed in the processor 38 to obtain a session encryption key e. Any suitable KDF may be utilized, typically one utilizing a secure hash function.

The message part $M_1$, is checked for a predetermined level of redundancy and, if that is not met, additional data added. The session encryption key e, is used to encrypt the message part $M_1$ to cyphertext C. The cyphertext C is then concatenated with the message part $M_2$ and hashed using a secure hash function H to obtain a value, h, i.e. $h=H(C, M_2)$.

A signature component s is then computed using the relationship s=k+dh mod n where n is the order of the generator G.

Data is then transferred through the RF ID tag 14 including the signature component s, the public part of the message $M_2$, (which includes the certificate of the public key Q) and the cyphertext C.

The reader 20 captures the data and initially verifies the public key Q from the certificate. It then computes a value V=sG−hQ and generates a private session key b from the RNG 52. A public session key U=bV is then computed and sent to the chip 12 through the RF ID connection. The chip 12 confirms that the point U is a point on the curve and generates a further public key W=dU that is sent back to the reader 20.

The reader then uses the private session key b to compute a value equal to R, namely $(b^{-1} \bmod n)$ W and then uses the KDF to get the value corresponding to e. Using the computed value of e, the cyphertext C is decrypted and the biometric data in the message part $M_1$ is recovered. The redundancy of the recovered data is checked and, if above the required level it is accepted.

The recovered data is then compared the reference data obtained from the scanner to authenticate the bearer of the passport.

By separating the message and encrypting the biometric data, its confidentiality may be maintained even to an eavesdropper.

The signing process above is quite efficient for the signer. The computation of R=kQ can be done in advance, or with assistance of fixed pre-computed multiples of Q. The most expensive step for the signer is computing W=dU.

The data exchange may also be enhanced by providing for authentication of the reader 20. In this way, the signer can choose whether or not to interact with the verifier. Ideally, the verifier should authenticate itself to the signer, such as by a digital signature or some symmetric key system. In this way, the signer can control to whom the message portion $M_1$ is revealed. This can be done prior to the initial exchange of data or during the exchange before the value W is transferred.

If the signing is too expensive computationally, then the following modification is possible. The verifier sets b=1. Then W=R, which the signer has already computed during signature generation. To keep $M_1$ confidential, this alternate approach requires that R can be sent to the verifier confidentially. In particular, passive eavesdroppers should not be able to intercept R. This might be accomplished by physical means, such as weak RF signals, or by some form of encryption, such as the e-passport basic access control encryption system.

By utilizing the bearer's public key Q in the computation of R, the signature cannot be verified without involvement of the bearer. In particular, the cyphertext C cannot be decrypted without the acquiescence of the bearer.

It will be noted that once the verifier recovers R, it can compute dQ, which can be seen to enable message recovery from the signature, that is, without the interactive verification process.

What is claimed is:

1. A method of maintaining confidentiality of sensitive information stored in a machine readable document pertaining to a correspondent during transmission of said sensitive information to a machine for examination, comprising:
   generating an encryption key e from a public key of said correspondent and encrypting said sensitive information with said encryption key e to obtain a ciphertext C,
   forwarding said ciphertext C to said machine,
   receiving from said machine an ephemeral public key obtained from an ephemeral private key b of said machine and said ciphertext C, and
   returning to said machine additional information to permit recovery of said sensitive information by said machine from said ciphertext C.

2. The method according to claim 1 further comprising:
   prior to forwarding said ciphertext C and said additional information to said machine, authenticating said machine to said machine readable document, wherein said ciphertext C and said additional information is forwarded to said machine only upon successful authentication of said machine.

3. The method according to claim 1, wherein said sensitive information is biometric information.

4. The method according to claim 1, wherein said ephemeral public key is used to generate said additional information.

5. The method according to claim 1, wherein said additional information permits recovery of said encryption key e.

6. The method according to claim 1, wherein said encryption key e is derived from a value R obtained from a long term public key Q of said correspondent and a session private key k generated by said machine readable document.

7. The method according to claim 6, wherein said additional information permits computation of said value R by said machine and thereby derivation of said encryption key e.

8. The method according to claim 6, wherein said long term public key Q has a corresponding long term private key d and said additional information is obtained from combining said long term private key d and said ephemeral public key.

9. The method according to claim 6, wherein said ephemeral public key incorporates a signature component s that binds a long term private key d of said correspondent and said session private key k with a hash h of said ciphertext C.

10. A method of maintaining confidentiality of sensitive information stored in a machine readable document pertaining to a correspondent during transmission of said sensitive information to a machine for examination, comprising:
    said machine initiating a request to assemble a message by said machine readable document, said message having a primary portion $M_1$ and a secondary portion $M_2$, said primary portion including a ciphertext C obtained from encrypting said sensitive information with a session encryption key e and said secondary portion containing less sensitive information retrieved from said machine readable document and including a long term public key of said one correspondent,
    receiving said message from said machine readable document,
    generating a value from said ciphertext C and said secondary portion $M_2$,
    generating an ephemeral private key, and utilizing said value and said ephemeral private key to generate a public session key from said value and said ephemeral private key,
    forwarding said public session key to said machine readable document and obtaining from said machine readable document additional information to permit recovery of said sensitive information from said ciphertext C, and
    said machine recovering said sensitive information from said ciphertext C using said additional information.

11. The method according to claim 10, wherein said additional information is a further public key that permit recovery of said session encryption key.

12. The method according to claim 10, further comprising:
    said machine comparing said recovered sensitive information with a reference input obtained directly from said correspondent to authenticate identity of the correspondent.

13. A machine readable document of a correspondent, said machine readable document having a cryptographic unit including an arithmetic processor for performing cryptographic operations and a random number generator to provide ephemeral session keys, a data communication interface for communicating with a machine for examining said machine readable document, and a memory device to store sensitive information in a secure manner, said data communication interface and said memory device being in data communication with said cryptographic unit, said cryptographic unit configured to implement a method comprising:

generating an encryption key e from a public key of said correspondent and encrypting said sensitive information with said encryption key e to obtain a ciphertext C, forwarding said ciphertext C to said machine, receiving from said machine an ephemeral public key obtained from an ephemeral private key b of said machine and said ciphertext C, and returning to said machine additional information to permit recovery of said sensitive information by said machine from said ciphertext C.

14. The machine readable document according to claim 13, wherein said cryptographic unit includes a secure memory device for storing private keys and certificates.

15. A machine for authenticating a correspondent based on sensitive information stored in a machine readable document pertaining to the correspondent, comprising:

a data processing engine, a data communication interface coupled to the data processing engine, the data communication interface being configured to communicate with a machine readable document having stored therein sensitive information pertaining to the correspondent, and a scanner coupled to the data processing engine for obtaining a reference input directly from the correspondent, wherein the data processing engine is configured to implement a method comprising:

initiating a request to assemble a message by said machine readable document, said message having a primary portion $M_1$ and a secondary portion $M_2$, said primary portion including a ciphertext C obtained from encrypting said sensitive information with a session encryption key e and said secondary portion containing less sensitive information retrieved from said machine readable document and including a long term public key of said one correspondent, receiving said message from said machine readable document, generating a value from said ciphertext C and said secondary portion $M_2$, generating an ephemeral private key, and utilizing said value and said ephemeral private key to generate a public session key from said value and said ephemeral private key, forwarding said public session key to said machine readable document and obtaining from said machine readable document additional information to permit recovery of said sensitive information from said ciphertext C, and recovering said sensitive information from said ciphertext C using said additional information.

* * * * *